US012595914B2

(12) United States Patent
     Cadima

(10) Patent No.: US 12,595,914 B2
(45) Date of Patent: Apr. 7, 2026

(54) GRIDDLE ASSEMBLY AND COOKTOP APPLIANCE

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 334 days.

(21) Appl. No.: 18/300,132

(22) Filed: Apr. 13, 2023

(65) Prior Publication Data

US 2024/0344705 A1     Oct. 17, 2024

(51) Int. Cl.
*F24C 3/00*      (2006.01)
*A47J 36/02*     (2006.01)
*A47J 36/36*     (2006.01)
*A47J 37/06*     (2006.01)
*F24C 15/10*     (2006.01)

(52) U.S. Cl.
CPC ............... *F24C 3/008* (2013.01); *A47J 36/02* (2013.01); *A47J 36/36* (2013.01); *A47J 37/0682* (2013.01); *F24C 15/108* (2013.01)

(58) Field of Classification Search
CPC ...... F24C 15/107; F24C 15/10; F24C 15/108; F24C 3/008; A47J 37/067; A47J 36/02; A47J 36/36; A47J 37/0682
See application file for complete search history.

(56) References Cited

U.S. PATENT DOCUMENTS

| | | | | |
|---|---|---|---|---|
| 5,619,910 | A * | 4/1997 | Farnsworth | A47J 37/0682 |
| | | | | 99/422 |
| 6,267,047 | B1 * | 7/2001 | Mosher, II | A47J 37/0786 |
| | | | | 99/425 |
| 7,380,548 | B2 | 6/2008 | Ryan et al. | |
| 10,429,075 | B2 | 10/2019 | Cadima | |
| 2014/0116415 | A1 | 5/2014 | Birke | |
| 2017/0067650 | A1 * | 3/2017 | Wie | F23D 14/78 |
| 2018/0142897 | A1 * | 5/2018 | Cadima | F24C 3/085 |
| 2021/0148575 | A1 * | 5/2021 | Cadima | F24C 3/027 |
| 2021/0227634 | A1 * | 7/2021 | Eggers | A47J 37/0676 |
| 2022/0007883 | A1 * | 1/2022 | Lampaert | A47J 37/0682 |

FOREIGN PATENT DOCUMENTS

| | | |
|---|---|---|
| CN | 207544955 U | 6/2018 |
| EP | 0940109 B1 | 5/2003 |

* cited by examiner

*Primary Examiner* — Allen R. B. Schult
*Assistant Examiner* — Amy E Carter
(74) *Attorney, Agent, or Firm* — Dority & Manning, P.A.

(57)          ABSTRACT

A griddle assembly and a cooktop appliance having a gas burner are provided. The griddle assembly is positioned above the gas burner and configured to receive heat therefrom. The griddle assembly includes a frame at which a griddle is positioned. The griddle assembly includes a heat shield positioned adjacent to a bottom surface of the griddle. The heat shield is positioned over the gas burner and along a vertical direction between the bottom surface of the griddle and the gas burner.

17 Claims, 12 Drawing Sheets

GRIDDLE ASSEMBLY AND COOKTOP APPLIANCE

FIELD

The present subject matter relates generally to cooktop appliances with griddle assemblies, such as gas range or gas stove appliances.

BACKGROUND

Certain cooktop appliances include gas burners for heating cooking utensils on the cooktop appliances and griddles integrated onto or into the gas cooktop. Griddle performance is generally measured in terms of uniform heating across the griddle cooking surface. Cooktop appliances having a single burner for the griddle, such as an elongated burner, are challenged to evenly heat the griddle cooking surface, such as along a perimeter or edge of the griddle cooking surface. Cooktops having multiple burners for the griddle may still be challenged to evenly heat the griddle cooking surface, such as by mitigating relatively hot or cold spots at the griddle cooking surface between burners, or at a perimeter or edge of the griddle cooking surface.

Accordingly, a cooktop appliance and griddle assembly that reduces a thermal gradient across the griddle cooking surface would be beneficial and advantageous.

BRIEF DESCRIPTION

Aspects and advantages of the invention will be set forth in part in the following description, or may be obvious from the description, or may be learned through practice of the invention.

An aspect of the present disclosure is directed to a cooktop appliance including a gas burner and a griddle assembly positioned above the gas burner and configured to receive heat therefrom. The griddle assembly includes a frame at which a griddle is positioned. The griddle assembly includes a heat shield positioned adjacent to a bottom surface of the griddle. The heat shield is positioned over the gas burner and along a vertical direction between the bottom surface of the griddle and the gas burner.

Another aspect of the present disclosure is directed to a griddle assembly for a gas burner. The griddle assembly includes a frame at which a griddle is positioned, and a heat shield positioned adjacent to a bottom surface of the griddle. The heat shield is positioned along a vertical direction between the bottom surface of the griddle and the gas burner.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
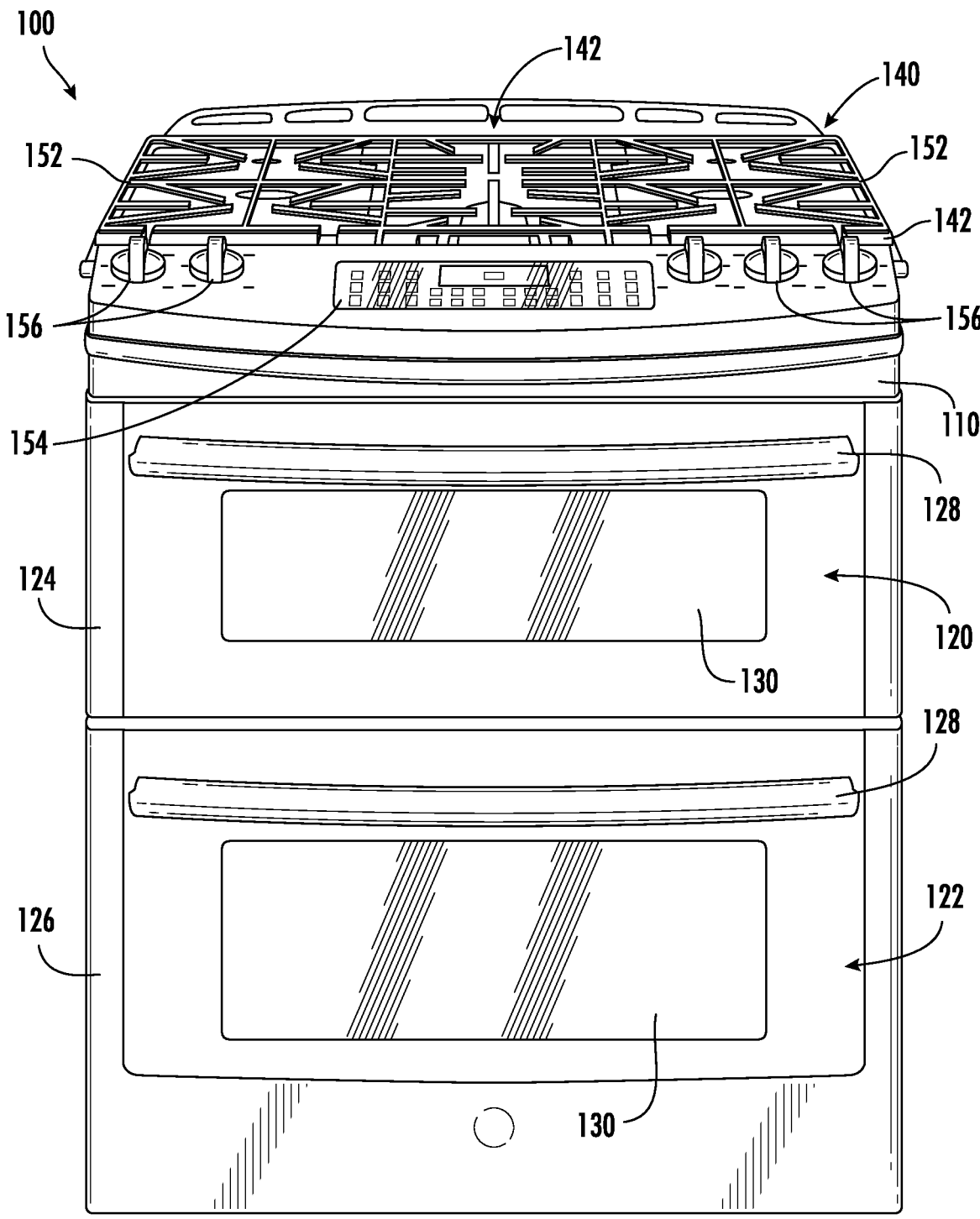
FIG. 1 provides a front, perspective view of a range appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 2:
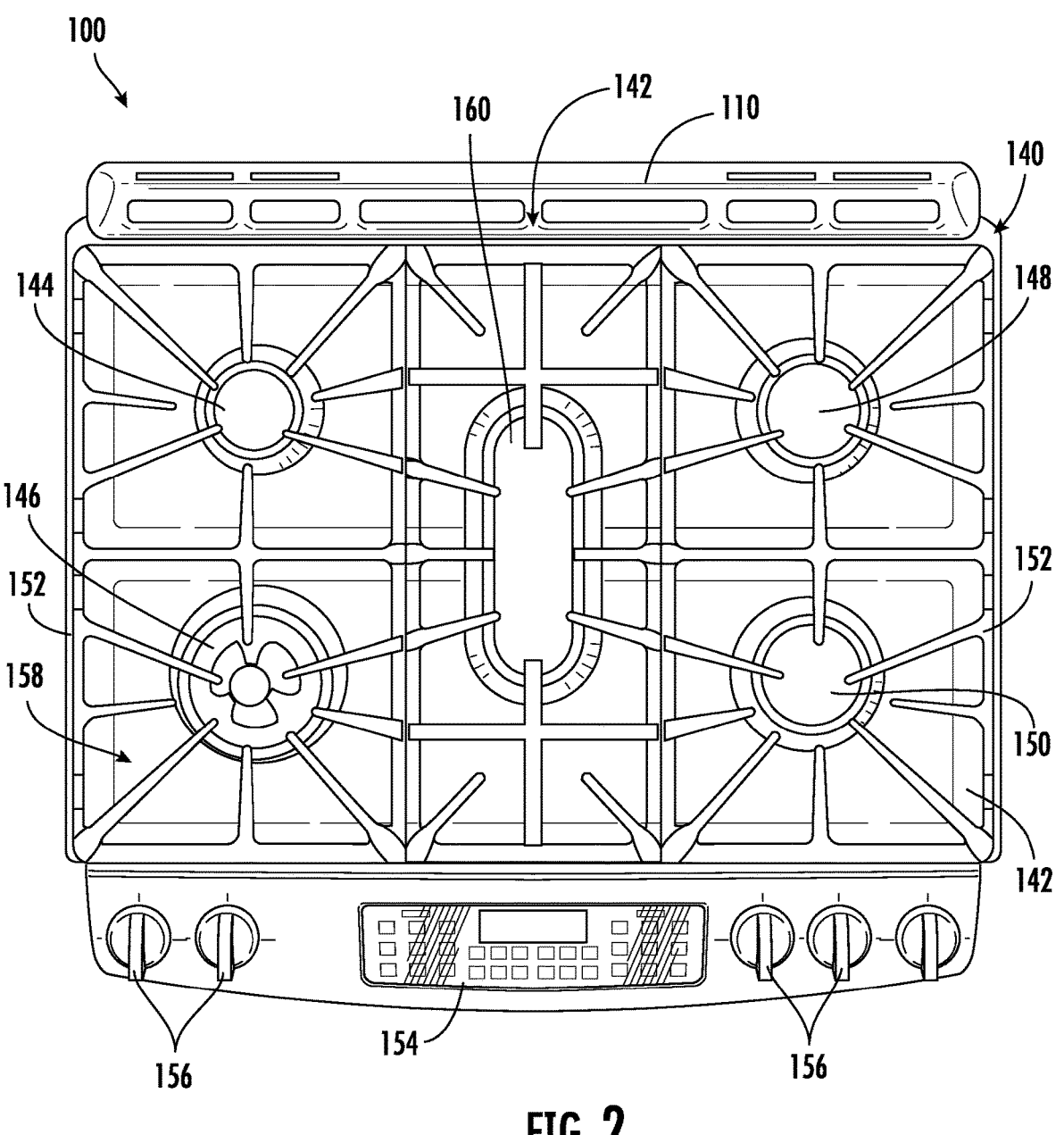
FIG. 2 provides a top, plan view of the exemplary range appliance of FIG. 1.

Turning now to the figures, FIG. 1 provides a front, perspective view of a range appliance 100 as may be employed with the present disclosure. FIG. 2 provides a top, plan view of range appliance 100. Range appliance 100 includes an insulated cabinet 110. Cabinet 110 defines an upper cooking chamber 120 and a lower cooking chamber 122. Thus, range appliance 100 is generally referred to as a double oven range appliance. As will be understood by those skilled in the art, range appliance 100 is provided by way of example only, and the present disclosure may be used in any suitable appliance (e.g., a single oven range appliance or a standalone cooktop appliance). Thus, the exemplary embodiment shown in FIG. 1 is not intended to limit the present disclosure to any particular cooking chamber configuration or arrangement.

Upper and lower cooking chambers 120 and 122 are configured for the receipt of one or more food items to be cooked. Range appliance 100 includes an upper door 124 and a lower door 126 rotatably attached to cabinet 110 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Glass windowpanes 130 provide for viewing the contents of upper and lower cooking chambers 120 and 122 when doors 124 and 126 are closed and also assist with insulating upper and lower cooking chambers 120 and 122. Heating elements (not shown), such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

Range appliance 100 also includes a cooktop 140. Cooktop 140 is positioned at or adjacent a top portion of cabinet 110. Thus, cooktop 140 is positioned above upper and lower cooking chambers 120 and 122. Cooktop 140 includes a top panel 142. By way of example, top panel 142 may be constructed of glass, ceramics, enameled steel, and combinations thereof. Moreover, top panel 142 may be formed as a unitary, single piece or, alternatively, as multiple discrete pieces joined together.

For range appliance 100, a utensil holding food or cooking liquids (e.g., oil, water, etc.) may be placed onto grates 152 at a location of any of burner assemblies 144, 146, 148, 150. Burner assemblies 144, 146, 148, 150 provide thermal energy to cooking utensils on grates 152. As shown in FIG. 1, burners assemblies 144, 146, 148, 150 can be configured in various sizes so as to provide, for example, for the receipt of cooking utensils (e.g., pots, pans, etc.) of various sizes and configurations and to provide different heat inputs for such cooking utensils. Grates 152 may be supported on a top surface 158 of top panel 142. In optional embodiments, range appliance 100 includes a griddle burner 160 positioned at a middle portion of top panel 142, as may be seen in FIG. 2. A griddle may be positioned on grates 152 and heated with griddle burner 160.

A user interface panel 154 is located within convenient reach of a user of the range appliance 100. For this exemplary embodiment, user interface panel 154 includes knobs 156 that are each associated with one of burner assemblies 144, 146, 148, 150 and griddle burner 160. Knobs 156 allow the user to activate each burner assembly and determine the amount of heat input provided by each burner assembly 144, 146, 148, 150 and griddle burner 160 to a cooking utensil located thereon. User interface panel 154 may also be provided with one or more graphical display devices that deliver certain information to the user such as, for example, whether a particular burner assembly is activated or the rate at which the burner assembly is set.

Although shown with knobs 156, it should be understood that knobs 156 and the configuration of range appliance 100 shown in FIG. 1 is provided by way of example only. More specifically, user interface panel 154 may include various input components, such as one or more of a variety of touch-type controls, electrical, mechanical or electro-mechanical input devices including rotary dials, push buttons, and touch pads. The user interface panel 154 may include other display components, such as a digital or analog display device designed to provide operational feedback to a user.

Figure 3:
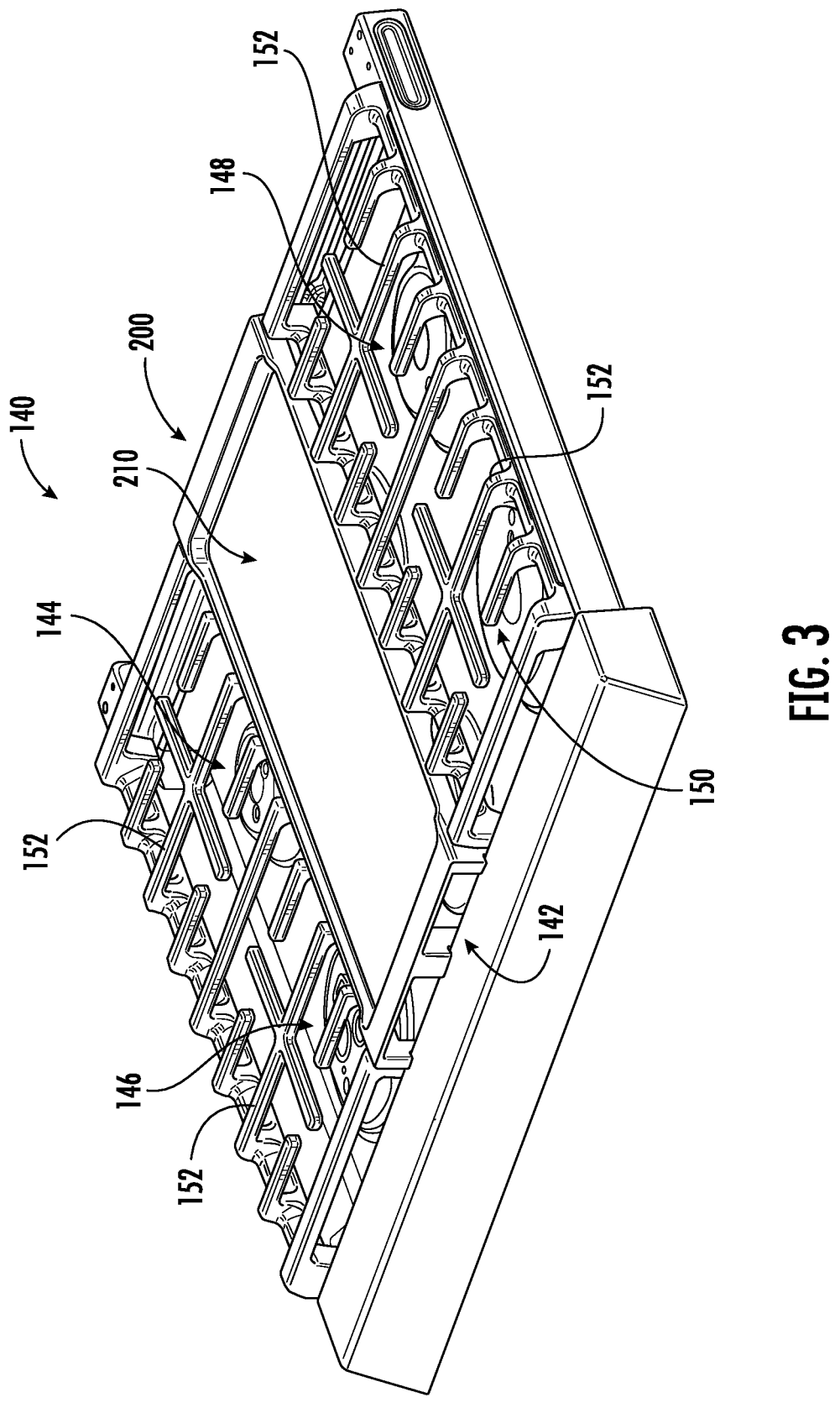
FIG. 3 provides a perspective view of a cooktop of a range appliance according to an exemplary embodiment of the present disclosure.
Figure 4A:
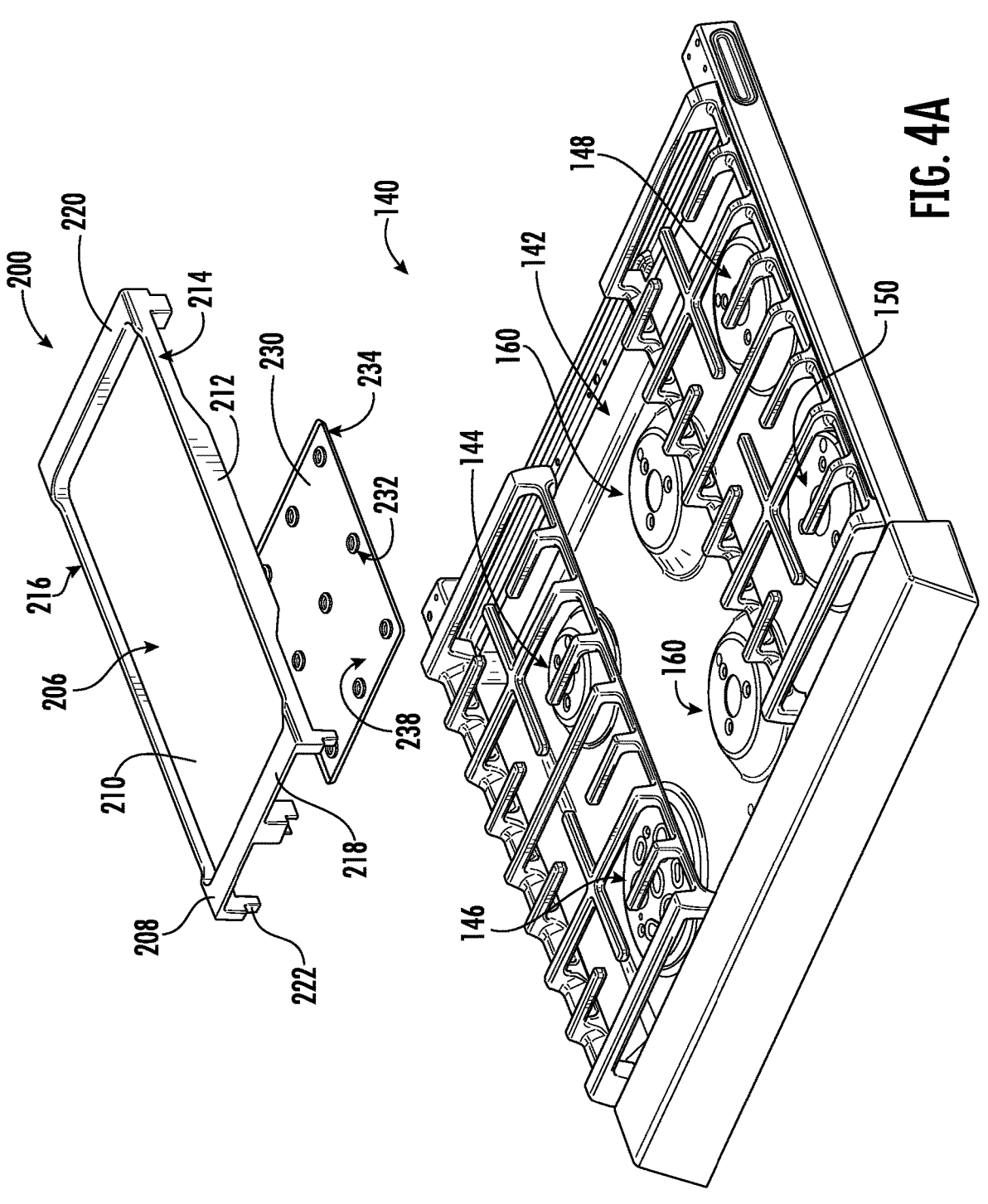
FIG. 4A provides an exploded perspective view of a cooktop of a range appliance according to an exemplary embodiment of the present disclosure.
Figure 4B:
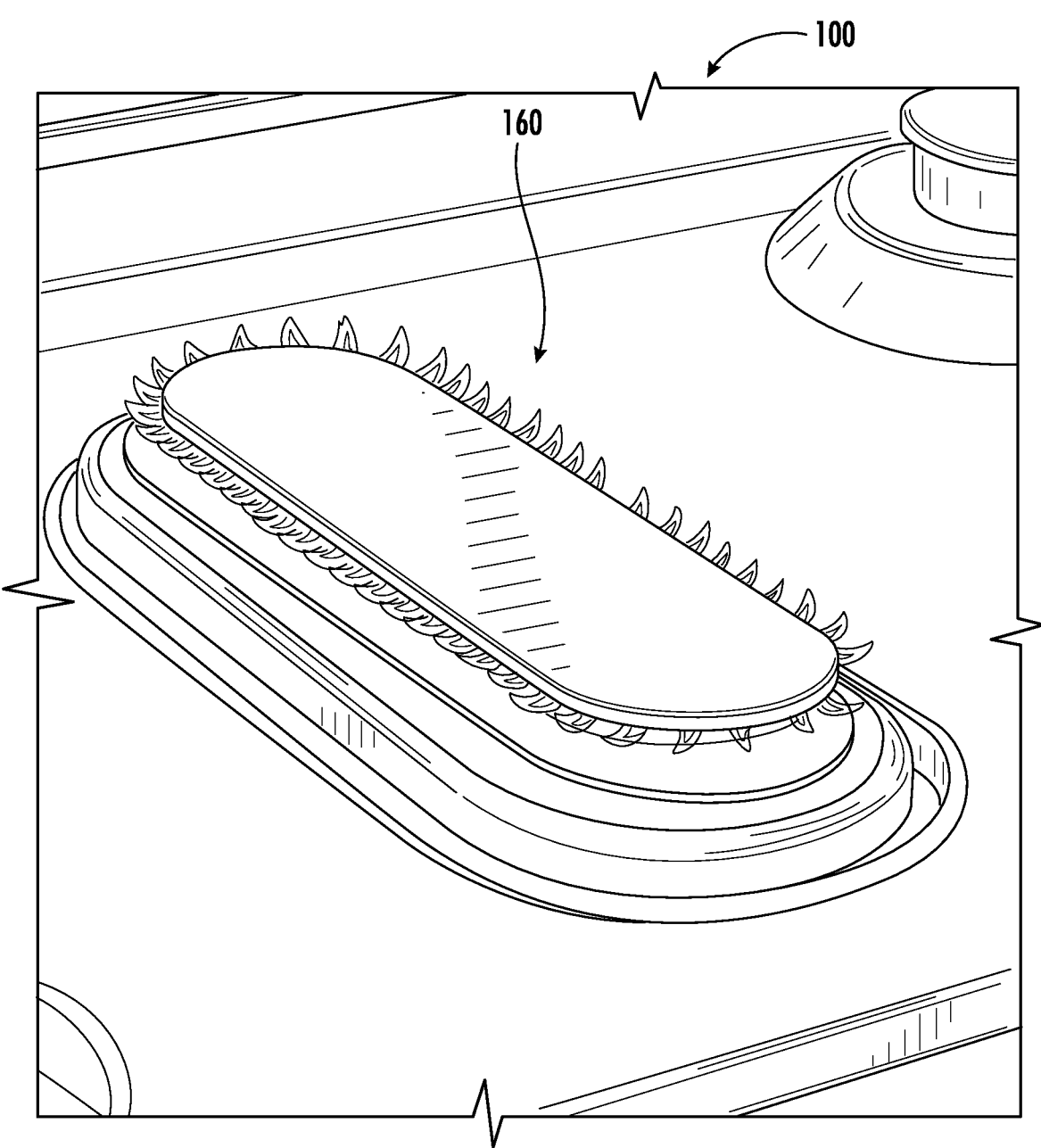
FIG. 4B provides a perspective view of a burner for a range appliance according to an exemplary embodiment of the present disclosure.

Referring now to FIGS. 3-11, embodiments of a griddle assembly 200 are provided. FIGS. 3-4 provide perspective views of an exemplary cooktop 140 for a range appliance, such as range appliance 100 depicted and described in regard to FIGS. 1-2. The cooktop 140 includes embodiments of the griddle assembly 200 such as depicted and described in regard to FIGS. 5-11. Embodiments of the cooktop 140 may include a plurality of griddle burners 160, such as depicted in FIG. 4A, or a single griddle burner 160, such as depicted in FIG. 4B. In various embodiments, the griddle burner 160 may be configured as an elongated burner, such as may have a racetrack, elliptical, or ovular perimeter.

Referring to FIGS. 3-11, the griddle assembly 200 includes a frame 208 at which a griddle 210 is positioned. The frame 208 extends along a width W and a length L. For instance, the length L may generally be greater than the width W, such as may form a rectangular perimeter at the frame 208. Legs 222 may extend from the frame 208, such as may support or position the griddle 210 above the griddle burner 160 along vertical direction V. The frame 208 includes end walls 218, 220 extending along the width W and separated along the length L by side walls 214, 216. The griddle 210 is positioned within the frame 208, such as may be circumscribed by end walls 218, 220 and side walls 214, 216.

The griddle 210 includes a top surface 206 at which food or other items to be heated is positioned. A bottom surface 226 extends opposite of the top surface 206, such as more proximate to the griddle burner 160 than the top surface 206. The griddle assembly 200 includes a heat shield 230 positioned adjacent to the bottom surface 226 of the griddle 210. In various embodiments, the heat shield 230 is formed from a first material separate from the griddle 210 formed from a second material. For instance, the heat shield 230 may include a steel or steel alloy material, such as, but not limited to, aluminized steel, stainless steel, or other appropriate high temperature material. The griddle 210 may include an aluminum or aluminum alloy material, such as a cast aluminum alloy or similar.

In various embodiments, a recess 242 at the bottom surface 226 forms a recess surface 240. The griddle assembly 200 includes a fastener 224 configured to retain the heat shield 230 adjacent to the recess surface 240. In various embodiments, the heat shield 230 is retained with relatively little conductive contact to the bottom surface 226. For instance, the fastener 224 may include a rivet, pin, shank, thread, or tie rod configured to be received at a corresponding fastener interface 232 at the heat shield 230. The fastener interface 232 includes an opening 244 through which the fastener 224 is extendable, such as to be received at the fastener interface 232. The fastener interface 232 may form a countersink, counterbore, or other appropriate hole through which a head of the fastener 224 may be received at or within the heat shield 230.

The heat shield 230 includes a bottom face 236 configured to receive a flame or direct thermal communication from the griddle burner 160. The heat shield 230 further includes a top face 238 extending adjacent to the recess surface 240 such that the top face 238 is more proximate to the recess surface 240 than the bottom face 236. The heat shield 230 is positioned relative to the bottom surface 226 such as to receive flames from the griddle burner 160 at the bottom face 236 rather than at the bottom surface 226 of the griddle 210. For instance, in various embodiments, the heat shield 230 is positioned relative to the bottom surface 226 such as to receive direct flames from the griddle burner 160 at the bottom face 236 rather than at the bottom surface 226 of the griddle 210.

As generally depicted in FIGS. 3-11, the heat shield 230 extends along the width W and length L to form a heat shield perimeter 234 within or less than a perimeter of the frame 208. Furthermore, an area of the bottom face 236 of the heat shield 230 is less than an area of the bottom surface 226 of the griddle 210. For instance, a heat shield perimeter 234 may be between approximately 50% and 99% of a perimeter of the bottom surface 226. For instance, a heat shield perimeter 234 may be approximately equal to an area of the recess surface 240 of the bottom surface 226. In some embodiments, the heat shield 230 extends along length L approximately 50% to approximately 99% of length L of the bottom surface 226, or between approximately 60% and approximately 99%, or between 70% and approximately 99%. In still some embodiments, the heat shield 230 extends along width W approximately 80% to approximately 99% of width W of the bottom surface 226, or between approximately 85% and approximately 99%, or between approximately 90% and approximately 99%. The heat shield 230 is positioned generally over the griddle burner 160 such that flames from the griddle burner 160 impinge the heat shield 230 rather than, or prior to, impinging the bottom surface 226. Accordingly, the heat shield 230 may be positioned centered relative to the griddle burner 160, or may be offset such as to allow the flames from the griddle burner 160 to impinge the heat shield 230 such as described.

Referring to FIGS. 8A-8B and FIGS. 9-10, in various embodiments, a distance 250 along the vertical direction V between the top face 238 and the recess surface 240 ranges from zero (i.e., the top face 238 and recess surface 240 abutting one another) to a gap forming a plenum 228. For instance, the plenum 228 is formed between the top face 238 and the recess surface 240. The plenum 228 may include the distance 250 along the vertical direction V between recess surface 240 and the top face 238 of up to approximately 0.25 inches. In some embodiments, the distance 250 is approximately 0.010 inches or greater. In still some embodiments, at least a portion of the top face 238 may touch or abut the recess surface 240.

In various embodiments, the distance 250 varies from a center cross-section along the length L (e.g., a cross-sectional area along width W and vertical direction V) to an outer periphery cross-section along the length L (e.g., more proximate to end walls 218, 220). The center cross-section (e.g., approximately 35% to approximately 65% along length L) of the griddle assembly 200 may include a maximum distance 250 and the outer periphery cross-section may include a minimum distance 250. In various embodiments, the maximum distance 250 is up to approximately 0.25 inches. In still various embodiments, the minimum distance 250 is approximately zero inches (i.e., the recess surface 240 and the top face 238 abutting one another), or at least approximately 0.010 inches, or up to approximately 0.100 inches. The variable distance 250 may allow for tuning heat distribution across the griddle 210, such as to provide a substantially uniform temperature across the griddle 210.

Figure 9:
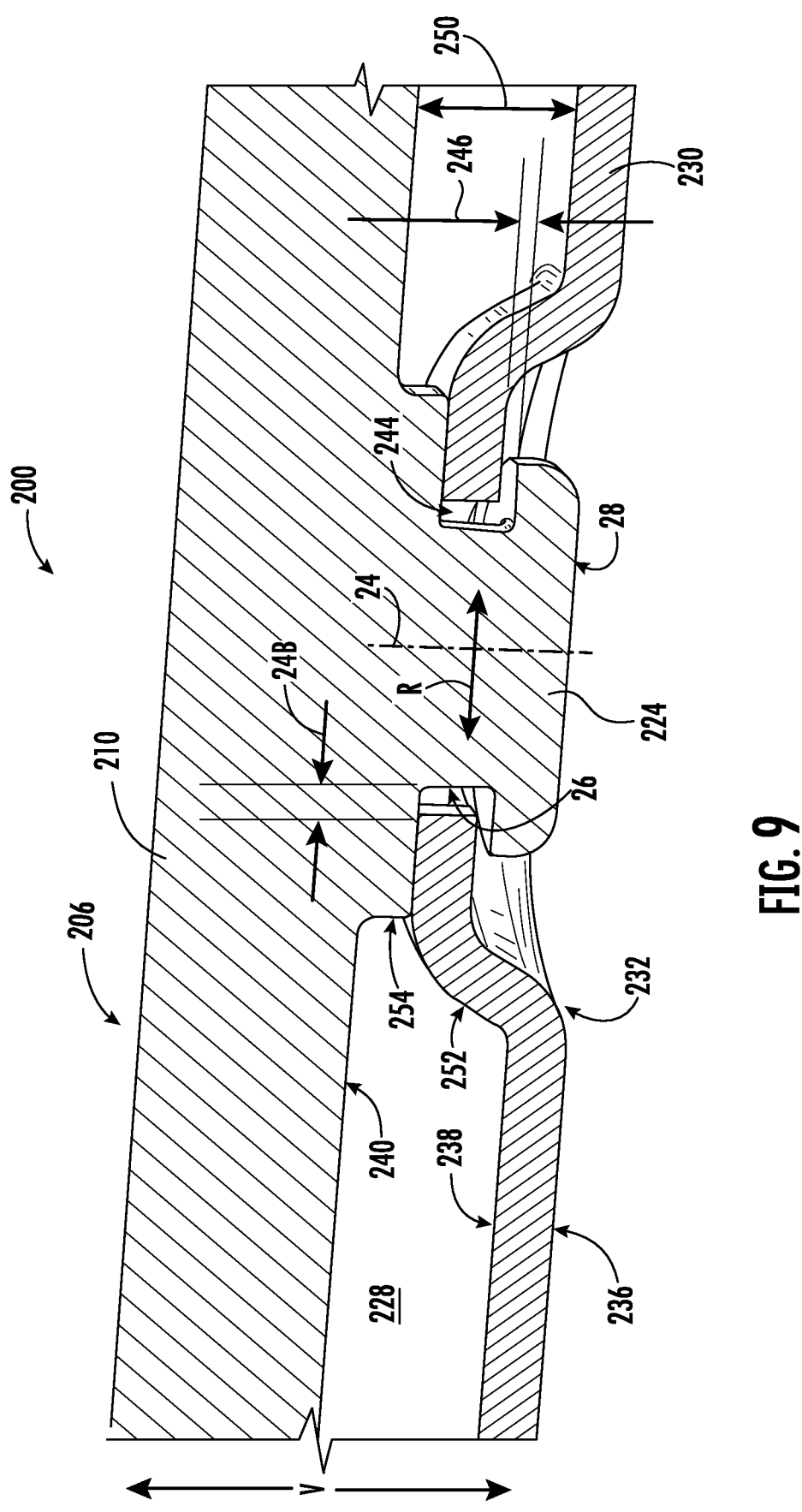
FIG. 9 provides a cutaway view of a portion of a griddle assembly for a cooking appliance according to an exemplary embodiment of the present disclosure.
Figure 10:
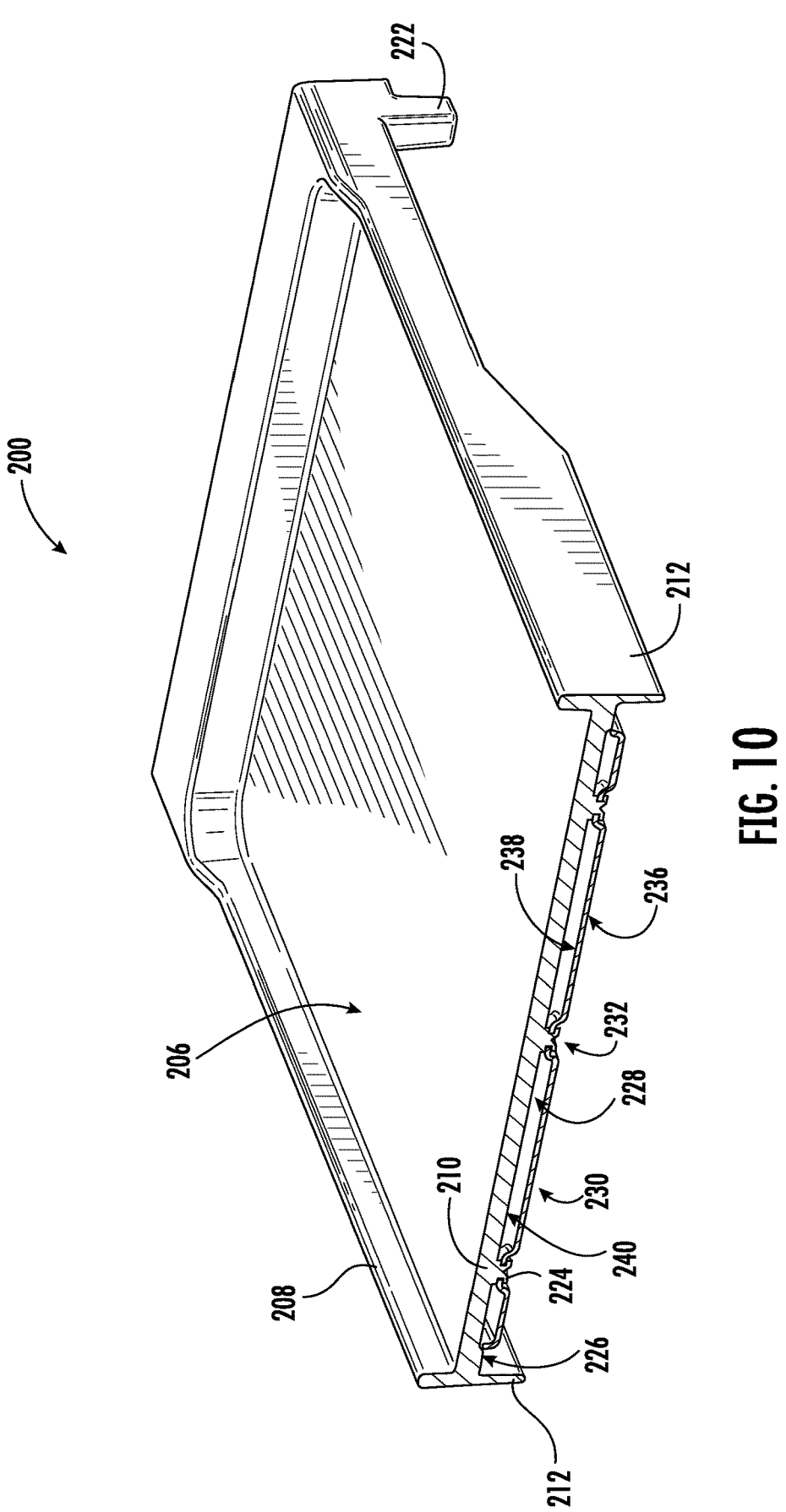
FIG. 10 provides a cutaway view of a griddle assembly for a cooking appliance according to an exemplary embodiment of the present disclosure.
Figure 11:
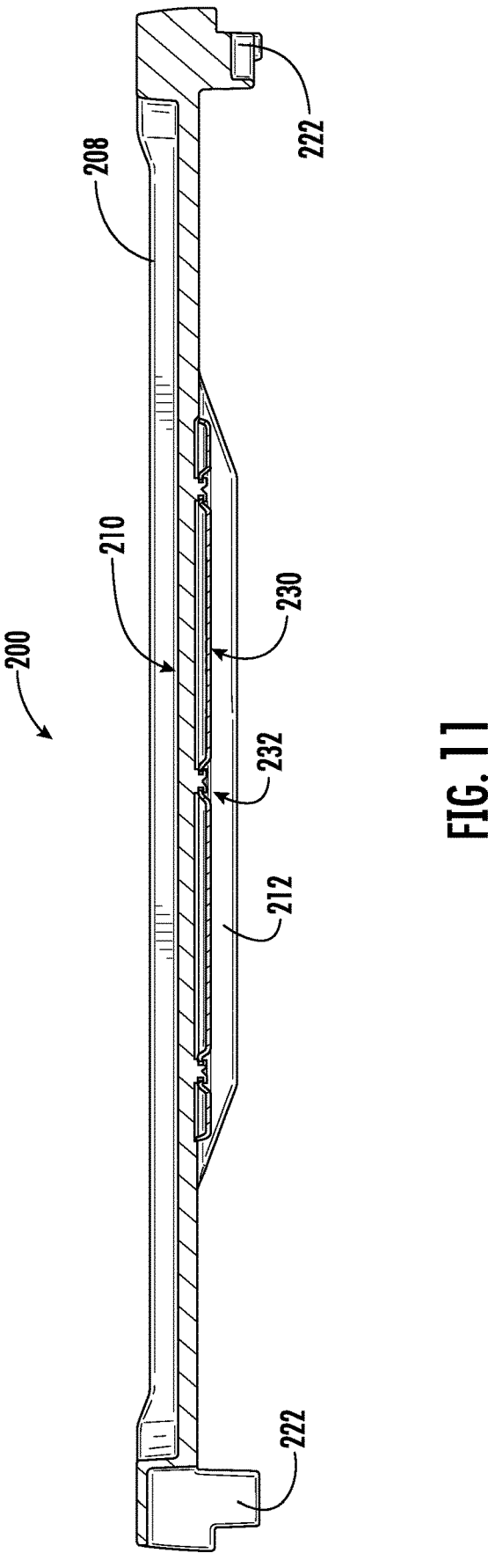
FIG. 11 provides a cutaway view of a griddle assembly for a cooking appliance according to an exemplary embodiment of the present disclosure.

Referring to FIG. 9, in various embodiments, the fastener 224 includes a neck 26 extending along the vertical direction V through opening 244 and a head 28 extending along a radial direction R from a center axis 24 of the neck 26. For instance, the fastener 224 and fastener interface 232 may form an integral rivet including the head 28 upset with radial forming to include material extending outward along the radial direction R without pinching the heat shield 230. In various embodiments, a radial gap 248 is formed between the opening 244 and the neck 28. The fastener 224 and fastener interface 232 may allow for movement of the heat shield 230 along the radial direction R relative to the griddle 210 due to thermal expansion. In still various embodiments, a vertical gap 246 is formed between the heat shield 230 and the head 28 or the recess surface 240 at which the fastener 224 is formed or positioned. For instance, flares or sinks 252, 254 at the fastener interface 232 formed at the griddle 210 and heat shield 230 may allow for limited surface area contact between the heat shield 230 and griddle 210, such as between the top face 238 and bottom surface 226, such as may limit conductive contact therebetween.

The griddle 210 may include the fastener 224 forming integral rivets forming gaps 246, 248 that may allow the griddle 210 to thermally expand fastener than the heat shield 230 without generating undesired stresses. However, it should be appreciated that, in various embodiments, the fastener 224 may include mechanical fasteners such as described herein forming one or more gaps 246, 248 to allow for desired thermal expansion of the griddle 210 relative to the heat shield 230.

Figure 5:
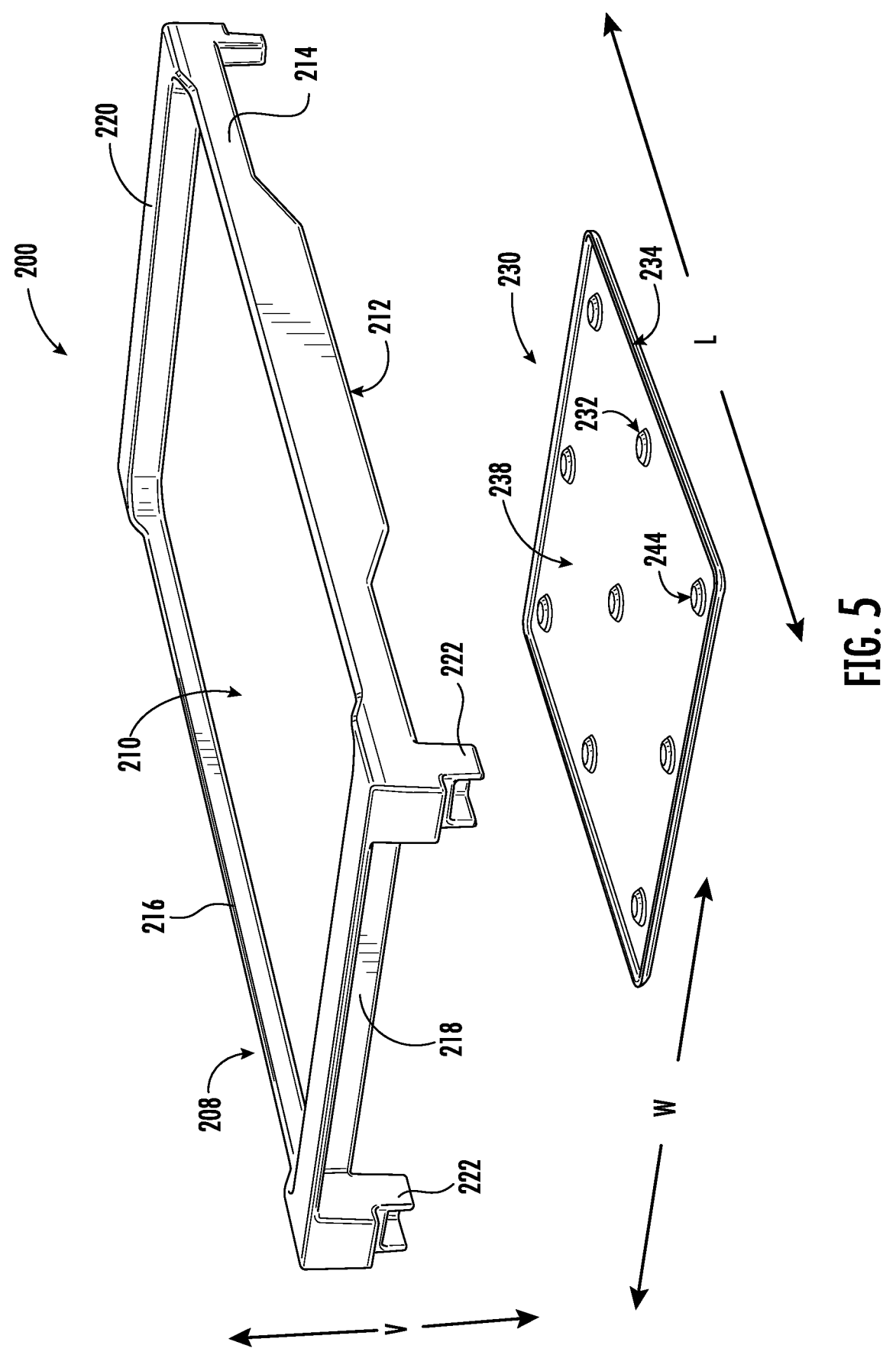
FIG. 5 provides an exploded perspective view of a griddle assembly for a cooking appliance according to an exemplary embodiment of the present disclosure.
Figure 6:
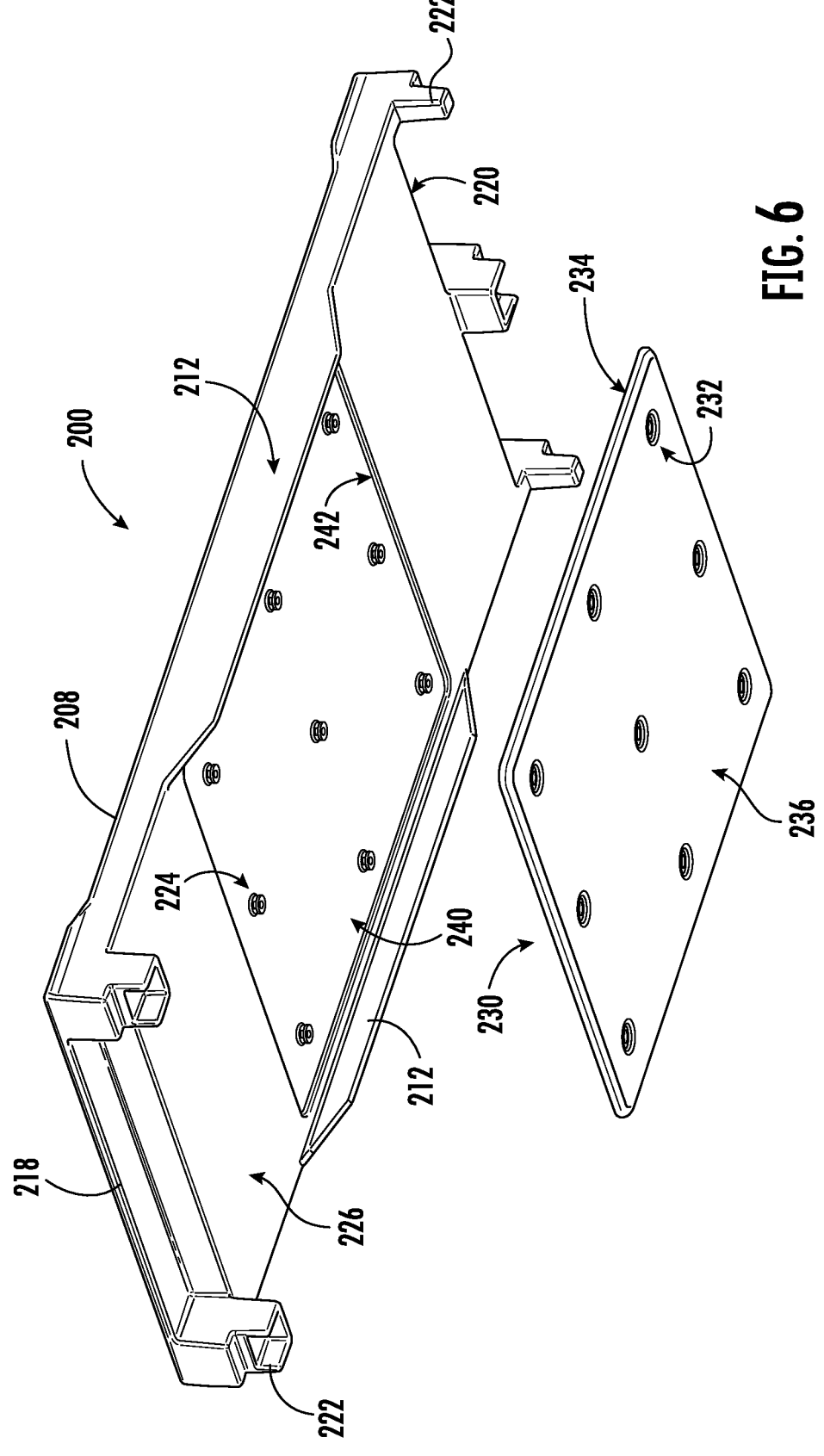
FIG. 6 provides an exploded perspective view of a griddle assembly for a cooking appliance according to an exemplary embodiment of the present disclosure.
Figure 7:
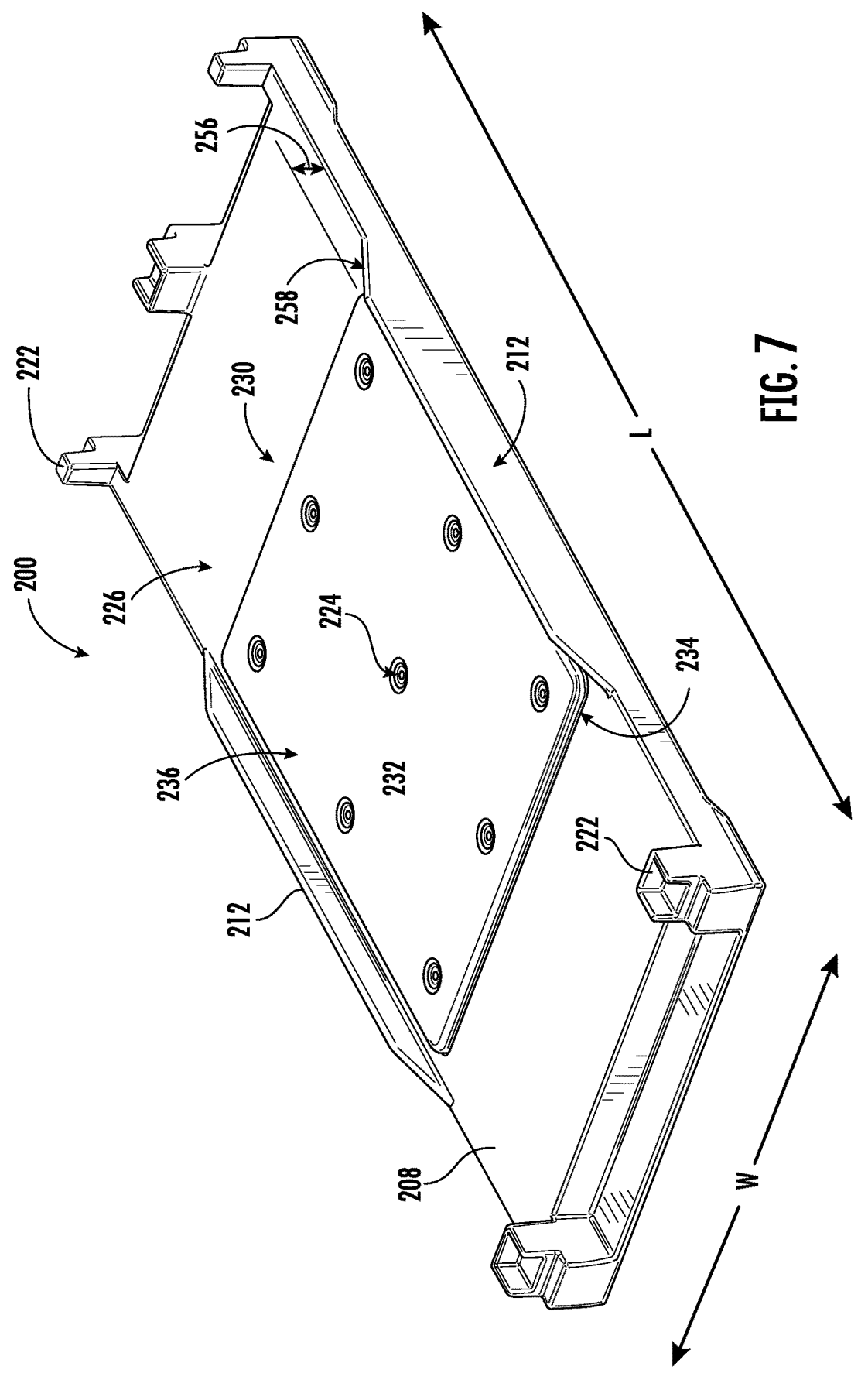
FIG. 7 provides a perspective view of a griddle assembly for a cooking appliance according to an exemplary embodiment of the present disclosure.
Figures 8A, 8B:
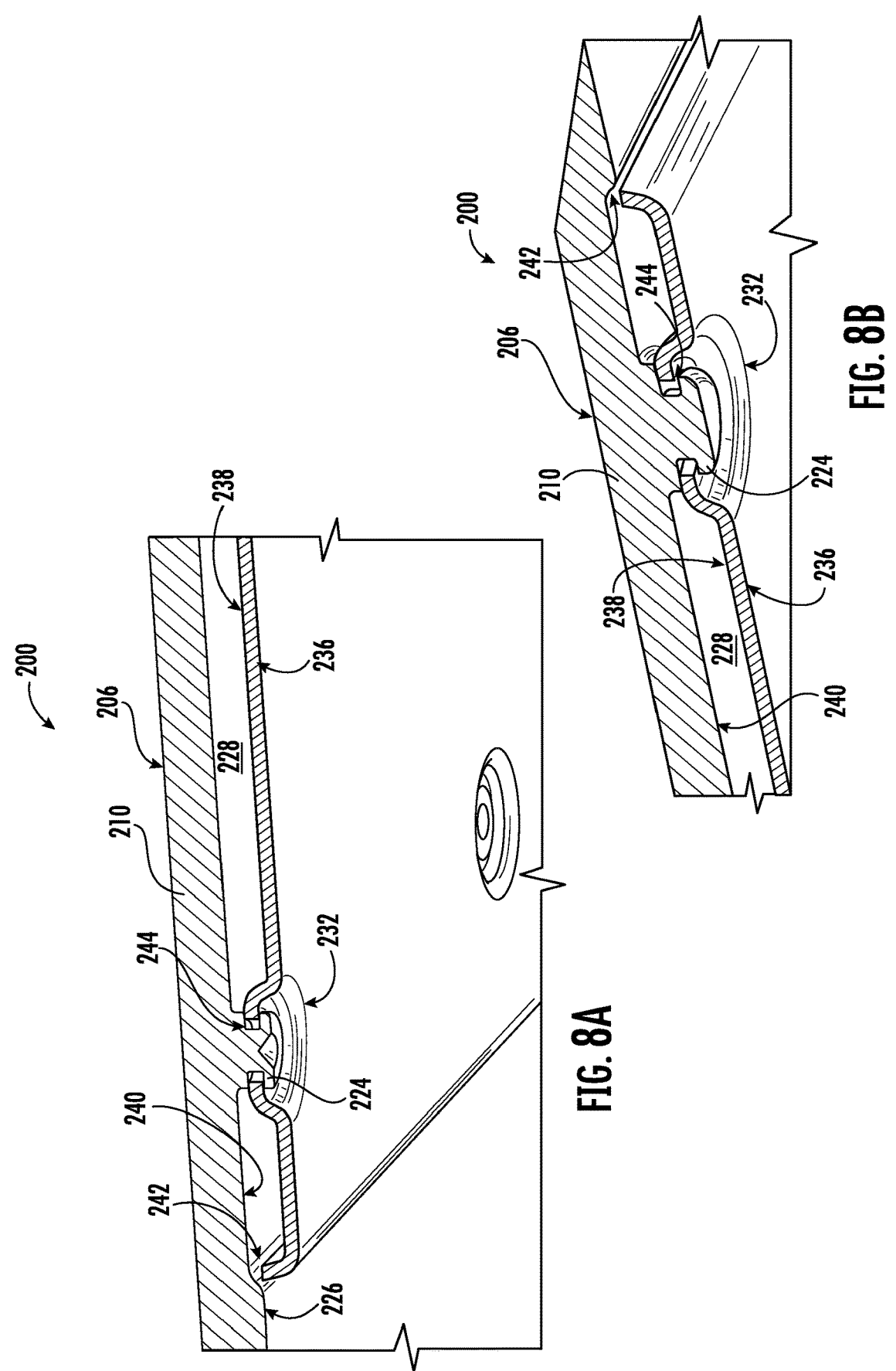
FIG. 8A provides a cutaway view of a portion of a griddle assembly for a cooking appliance according to an exemplary embodiment of the present disclosure.
FIG. 8B provides a cutaway view of a portion of a griddle assembly for a cooking appliance according to an exemplary embodiment of the present disclosure.

In some embodiments, such as depicted in FIGS. 5-7, a deflector 212 extends along the length L and vertical direction V at the side walls 214, 216. The deflector 212 forms a portion of the side wall 214, 216 extending downward along the vertical direction V (i.e., toward the griddle burner 160). The deflector 212 extends along the length L corresponding to an extension of the heat shield 230 along the length L. For instance, as depicted in FIGS. 6-7, the deflector 212 extends approximately equal to or at least as long as the heat shield 230 along the length L. In various embodiments, the deflector 212 extends for a distance 256 along the vertical direction V from the side wall 214, 216. The distance 256 may be at least approximately 0.10 inches, or at least approximately 0.30 inches, or at least approximately 0.50 inches, or at least approximately 0.75 inches. The distance 256 may extend less than an extension of leg 222 along the vertical direction V. The deflector 212 may include a transition portion 258, such as an angled or curved portion extending from the side wall 214, 216. The deflector 212 may be positioned at one or both of side walls 214, 216.

Embodiments of the griddle assembly 200 including the deflector 212 may promote redirection of heat or exhaust from flames from the griddle burner 160. The deflector 212 may increase a residence time of heat beneath the griddle 210, such as by inhibiting escape of heat or exhaust along the side walls 214, 216. Accordingly, heat loss along the side walls 214, 216, or particularly along the heat shield 230 adjacent to the side walls 214, 216, may be mitigated. Heat or exhaust may be encouraged to flow along the length L toward at which the deflector 212 ends.

Various embodiments of the griddle assembly 200 may improve residence time of heat or exhaust gases from the griddle burner 160 beneath the griddle 210, such as to improve heating and heat distribution across the griddle 210. The heat shield 230 may add a material layer between the griddle burner 160 and the griddle 210 to advantageously alter a rate of heat transfer and temperature distribution at the griddle 210 at which the heat shield 230 is located in contrast to portions of the griddle 210 without the heat shield 230. The additional material layer from the heat shield 230 may result in a more even thermal distribution across the entire griddle 210.

In still various embodiments, the griddle assembly 200 may result in a decreased maximum temperature at the griddle 210 while generating a more even temperature distribution across the griddle 210, in contrast to griddles without heat shields, deflectors, or both. However, embodiments of the range appliance 100 may be configured to allow for increased heating from the griddle burner 160 (e.g., in contrast to known griddle burners, or in contrast to burner assemblies 144, 146, 148, 150), such as to compensate for decreased maximum temperature at the griddle 210 relative to griddles without heat shields, deflectors, or both, at similarly configured griddle burners. In still various embodiments, a decreased maximum temperature at the griddle 210 may be insufficient to substantially impact cooking performance, and improved thermal distribution at the griddle 210 may still be advantageously and beneficially achieved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:
a gas burner; and
a griddle assembly positioned above the gas burner and configured to receive heat therefrom, the griddle assembly comprising a frame at which a griddle is positioned, the griddle comprising an integrally formed rivet comprising a neck and a head, the griddle assembly comprising a heat shield positioned adjacent to a bottom surface of the griddle, wherein the heat shield is positioned over the gas burner and along a vertical direction between the bottom surface of the griddle and the gas burner, wherein the heat shield comprises an opening configured to receive the rivet, and wherein a radial gap is formed between the opening at the heat shield and the neck of the rivet, wherein the heat shield comprises a steel or steel alloy material, and wherein the griddle comprises an aluminum or aluminum alloy material.

2. The cooktop appliance of claim 1, wherein a gap is formed along the vertical direction between the bottom surface of the griddle and a top face of the heat shield.

3. The cooktop appliance of claim 2, wherein the gap varies from a center cross-section along a length of the griddle assembly to an outer periphery cross-section along the length, wherein the gap at the center cross-section is greater than the gap at the outer periphery cross-section.

4. The cooktop appliance of claim 2, wherein the gap is up to 0.25 inches.

5. The cooktop appliance of claim 1, wherein the rivet and the opening at the heat shield allow for movement of the heat shield relative to the griddle between the neck of the rivet and the heat shield along the radial gap, and between the heat shield and the head of the rivet along a vertical gap.

6. The cooktop appliance of claim 1, wherein a vertical gap is formed at a fastener interface at which a flare and sink is formed at the heat shield and the griddle at the opening of the heat shield through which the rivet extends.

7. The cooktop appliance of claim 1, wherein a deflector extends from a side wall at the frame, the deflector extending along a length of the frame alongside the length of the heat shield.

8. The cooktop appliance of claim 7, wherein the deflector extends along the vertical direction toward the gas burner.

9. The cooktop appliance of claim 8, wherein the deflector extends along the vertical direction no greater than an extension of a leg at the frame.

10. The cooktop appliance of claim 8, wherein the deflector extends along the vertical direction toward the gas burner at least 0.10 inches.

11. The cooktop appliance of claim 1, wherein the bottom surface of the griddle comprises a recess surface, and wherein the heat shield is positioned adjacent along the vertical direction to the recess surface.

12. The cooktop appliance of claim 11, wherein a plenum is formed between the recess surface and a top face of the heat shield, and wherein a distance between the recess surface and the top face of the heat shield is up to 0.25 inches.

13. The cooktop appliance of claim 1, wherein the heat shield is positioned relative to the bottom surface of the griddle to receive a flame from the gas burner at a bottom face of the heat shield.

14. The cooktop appliance of claim 1, wherein the heat shield extends along a length and a width to form a perimeter corresponding to between 50% and 99% of a perimeter of the bottom surface of the griddle.

15. The cooktop appliance of claim 14, wherein a plenum is formed between the bottom surface of the griddle and a top face of the heat shield, and wherein a distance between the bottom surface of the griddle and the top face of the heat shield is up to 0.25 inches.

16. A griddle assembly for a gas burner, the griddle assembly comprising:
a frame at which a griddle is positioned, wherein the frame comprises a deflector that extends from a side wall at the frame, the deflector extending along a vertical direction toward a gas burner no greater than an extension of a leg at the frame; and
a heat shield positioned adjacent to a bottom surface of the griddle, the griddle comprising a rivet comprising a neck and a head, wherein the heat shield comprises an opening through which the neck of the rivet extends and positions the heat shield along the vertical direction between the bottom surface of the griddle and the gas burner, wherein the deflector extends along a length of the frame alongside a corresponding length of the heat shield, wherein a radial gap is formed the opening at the heat shield and the neck of the rivet, wherein the heat shield comprises a steel or steel alloy material, and wherein the griddle comprises an aluminum or aluminum alloy material.

17. The griddle assembly of claim 16, wherein a vertical gap is formed at a fastener interface at which a flare and sink is formed at the heat shield and the griddle at the opening of the heat shield through which the rivet extends.

\* \* \* \* \*